United States Patent [19]
Zimmer et al.

[11] 3,981,550

[45] Sept. 21, 1976

[54] BEARING IMPROVEMENT

[75] Inventors: George A. Zimmer; Hilarius S. Struttmann, both of Ithaca, N.Y.

[73] Assignee: Borg-Warner Corporation, Chicago, Ill.

[22] Filed: Jan. 20, 1975

[21] Appl. No.: 542,482

[52] U.S. Cl. ............................ 308/194; 308/187
[51] Int. Cl.² ........................................ F16C 23/00
[58] Field of Search ............ 308/194, 207, 184, 73, 308/35, 187.1, 187

[56] References Cited
UNITED STATES PATENTS

| | | |
|---|---|---|
| 3,113,812 | 12/1963 | Dotter .......................... 308/187.1 |
| 3,758,179 | 9/1973 | Smith ........................... 308/187.1 |
| 3,773,397 | 11/1973 | Struttmann et al. ............ 308/194 |
| 3,845,999 | 11/1974 | Zimmer et al. ................. 308/194 |
| 3,885,842 | 5/1975 | Furutsu ......................... 308/187 |

Primary Examiner—M. H. Wood, Jr.
Assistant Examiner—Richard A. Bertsch
Attorney, Agent, or Firm—Aubrey L. Burgess

[57] ABSTRACT

Resilient, preferably elastomeric or plastic means of a low modulus of elasticity are located in the lubrication passageway of a bearing housing to seal with the bearing race and to insure passage of lubricant to a lubricant opening in the bearing race and thus into the bearing and to its anti-friction elements.

10 Claims, 8 Drawing Figures

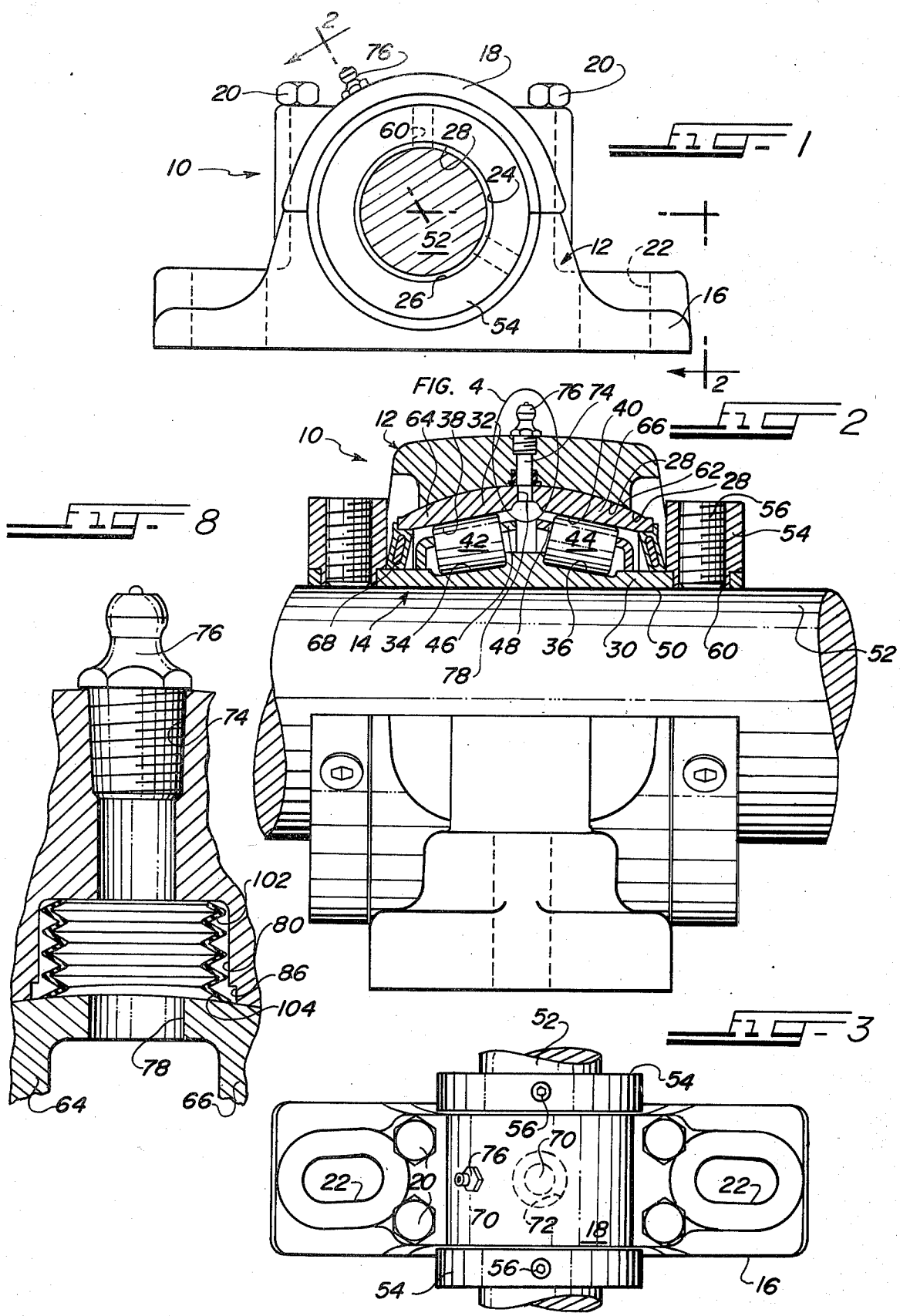

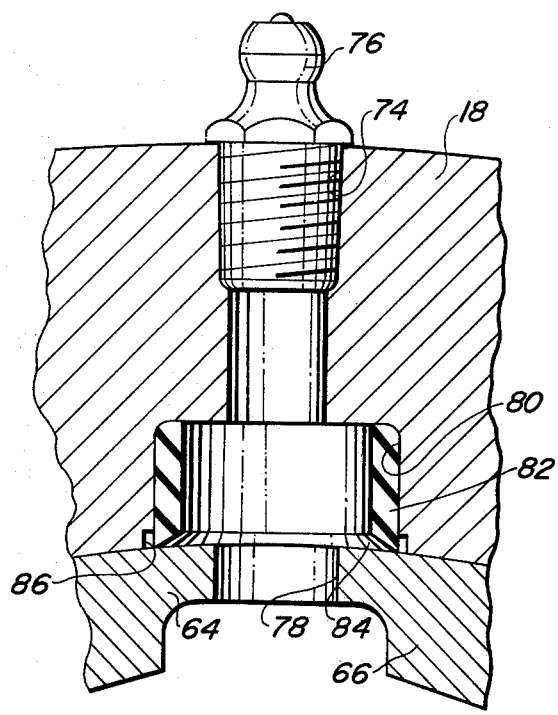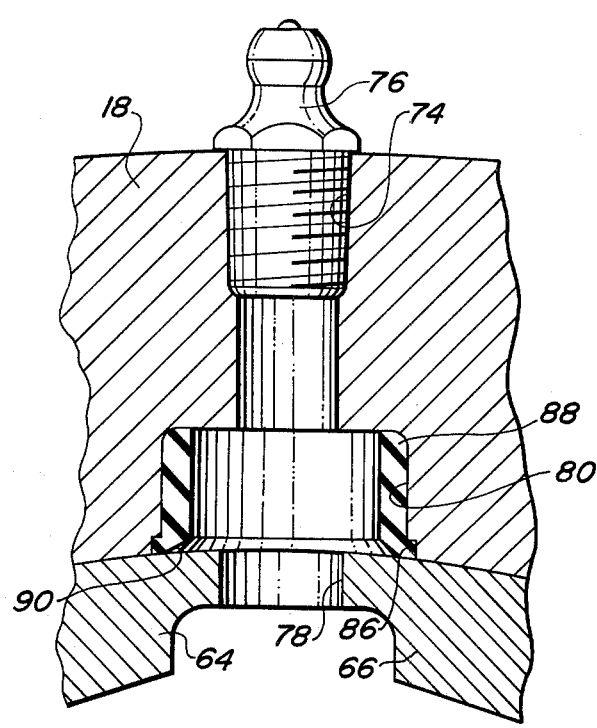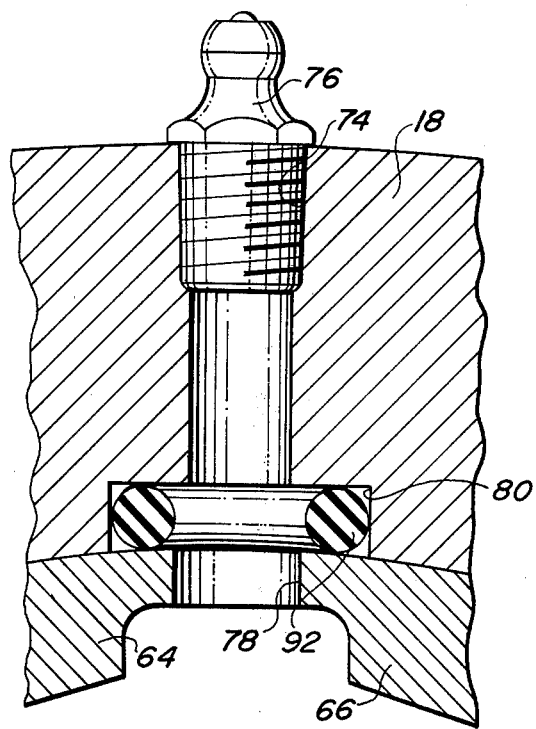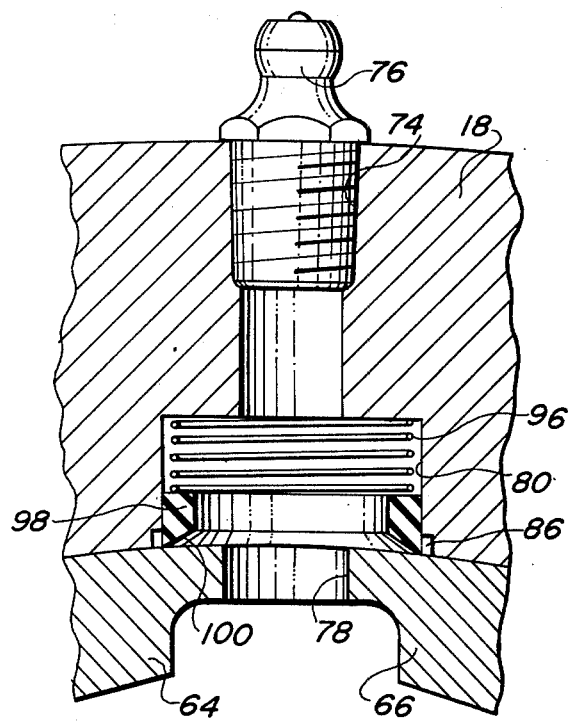

BEARING IMPROVEMENT

BACKGROUND OF THE INVENTION

This invention relates to bearings in which there is a housing having an opening to receive a bearing unit or cartridge comprising at least inner and outer races and anti-friction means or rolling elements therebetween in contact with inner and outer raceways on the races. There is a need to supply lubricant to the anti-friction means, such as balls or rollers, and to effectuate the supply, there is provided a passageway through the housing into which an exterior lubricant fitting or nipple is received and the bearing unit is constructed with an opening or passage to permit the passage of lubricant introduced at the fitting to pass through the passageway and through the bearing unit opening or passage into the interior of the bearing unit to the anti-friction means or rolling elements.

Geometric inaccuracies between the housing and the bearing unit can result in lubricant leakage, and at times, may be such to cause inadequate lubrication of the rolling elements of the bearing.

The Invention

It is proposed according to this invention to provide a seal between the housing and the bearing unit or cartridge to insure the passage of lubricant to the interior of the unit and materially reduce lubricant leakage as a result of geometric inaccuracies in the assembly or for other reasons, such as the ability of the bearing assembly to accomodate shaft misalignment in which case there is a pivoting of the bearing unit about its geometric center in the housing. The seal between the housing and the bearing cartridge is such as not to impede or restrict the self-aligning feature, which is desirable.

The object as stated above is accomplished by inserting a resilient member in the housing passageway which accommodates the shape of the outer surface or surfaces of the bearing unit such that it will deform to some limited degree yet provide a seal between the bearing unit and the housing while permitting at least some limited movement therebetween if necessary (and if the assembly is so constructed) to accommodate shaft misalignment. The resilient member can be a substantially cylindrical member with a conical end made of an elastomer or thermoplastic material of low modulus of elasticity; it can be an O-ring; it can be the combination of a resilient member and a coil or helical spring; or it can be a resilient bellows-type structure. The particular material in contact with the bearing unit is selected from materials such as natural or synthetic rubber, plastic of low modulus of elasticity (such as nylon, "Delrin" and "Teflon") and the like, having suitable properties of deformation and resistance to the particular lubricant to be used.

For purposes of the foregoing description, reference will be specifically made to roller bearing assemblies constructed to be fully self-aligning to accommodate shaft misalignment. It is to be understood that the invention is equally applicable to ball bearing assemblies and needle bearing assemblies, as well as to bearings of the fixed variety which do not accommodate shaft misalignment.

THE DRAWINGS

FIG. 1 is a side elevation of a bearing assembly incorporating this invention;

FIG. 2 is a sectional view taken on line 2—2 of FIG. 1 and illustrating one embodiment of this invention;

FIG. 3 is a plan view of the bearing assembly of FIGS. 1 and 2;

FIG. 4 is an enlarged, partial sectional view illustrating the embodiment of FIG. 2; and FIGS. 5, 6, 7 and 8 are enlarged, partial sectional views similar to FIG. 4 illustrating other embodiments of the invention.

DETAILED DESCRIPTION

Reference is made to FIGS. 1 to 4 illustrating a preferred embodiment of the invention. There is illustrated a bearing assembly, generally identified as 10, which comprises a housing 12 and a bearing unit or cartridge 14. In this embodiment, the housing 12 is of the split pillow block type having a base 16 and a top 18 connected by bolts 20. The base 16 is slotted at 22 to receive bolts (not shown) by which it is connected or fixed to a support (also not shown). The slots 22 are elongated for permitting adjustment of the lateral position of the assembly. The housing 12 is provided with a central opening 24 defined by complementary arcuate surfaces 26, 28 in the base 16 and top 18, respectively.

The bearing unit or cartridge 14 comprises inner and outer races 30 and 32, respectively, each having spaced, conical raceways, the inner raceways being identified as 34, 36 and the outer raceways being identified as 38 and 40. A row of rollers 42 contacts and rolls on the opposed raceways 34 and 38 and a row of rollers 44 contacts and rolls on the opposed raceways 36 and 40. The rollers 42 are spaced by a roller retainer 46 while the rollers 44 are spaced by a roller retainer 48. The inner race 30 is provided with a central bore 50 to receive a shaft 52. The shaft 52 is locked to the inner race by locking collars 54 which surround outward extensions of the inner race and by socket head screws 56 in appropriately spaced threaded openings 58 in the collars 54 and which passing through spaced openings 60 in the inner race 30 to bite into the shaft 52. Modifications in the manner of locking the inner race (and thus the bearing cartridge) to the shaft can be made without departing from the spirit of this invention, the manner described being illustrative of one of many known ways for accomplishing the connection.

The outer race 32 is defined by an outer arcuate surface 62 which contacts the inner surfaces 26 and 28 of the housing opening 24. Preferably, the outer race is constructed of two, alike, generally circular parts 64, 66, centrally joined together, as for example, by using the electron beam welding technique during which there is little or no distortion of the parts. At the outer extremities of the outer race parts, lubricant seals 68 are located between the inner and outer races, which seals lubricant in and dirt out.

The bearing cartridge 14 is provided with a locking or locating pin 70 extending outwardly of the surface 62 of the outer race 32 which is received in a cavity 72 opening into the housing 12 (both of which are shown in broken lines in FIG. 3). This arrangement restricts rotary motion of the outer race 32 with the shaft 52 while permitting pivoting motion (i.e. limited rotary motion) of the cartridge 14 about its geometric center relative to the housing 12 to accommodate shaft misalignment relative to the housing support.

In accordance with this invention, the housing top 18 is provided with a passageway 74 for the passage of lubricant from a lubricant fitting or nipple 76 threadably received in a threaded portion of the passageway to the bearing cartridge 24. For this passage, the outer race 32 or at least one of the parts, either or both parts 64, 66, thereof is provided with an opening or passage 78 leading into the cartridge and substantially aligned with the passageway 74. (See FIG. 4 for enlarged showing). The fitting or nipple 76 is of standard construction having a central opening and adapted to receive a grease gun or the like for the introduction of lubricant, as is customary. The passageway 74 in the preferred embodiment is counterbored at 80 to about one-third or more of its depth (to a depth which does not materially weaken the housing) and a cylindrical, resilient sealing means 82 having a length slightly in excess of the counterbore depth is received in the counterbore. The sealing means 82 in this embodiment has a conical lip 84 which slightly deforms and seals with the outer surface 62 of the outer race 32. To insure the seal and permit some, but slight deformation of the lip, the passageway 74 may be counterbored at 86 to a greater diameter and much less depth and thus enhance the seal with the outer race 32. As is easily understood, the provision of the member 82 restricts leakage of lubricant along the interface of the other surface of he cartridge and the opening or passage of the housing.

Attention is now invited to FIGS. 5, 6, 7 and 8 illustrating various other embodiments of the invention and wherein the primary difference is in the resilient member inserted in the counterbore of the lubrication passageway through the housing. Thus in each figure, like reference numbers are used to denote like parts, such that each figure shows a part of the top 18 of the housing 12, the outer race 32 and its parts 64 and 66, the passageway 74 and 78 in the housing 12 and the race 32, respectively, the counterbore 80, the lubricant fitting 76 and, in FIGS. 5 and 7 a second counterbore 86.

In FIG. 5 the resilient member, herein identified as 88, is shaped to fit into both counterbores 80 and 86 and is provided with a conical lip 90 to seal with the cartridge.

In FIG. 6, an O-ring 92 comprises the resilient member. Here the depth of the counterbore 80 is adjusted for the resilient member 92.

In FIG. 7, the resilient member 94 is constructed of a helical spring 96 and an elastomeric cylindrical part 98, the spring 96 urging the part 98 toward the outer race 32. Here, as in other embodiments, the part 98 is provided with a conical lip 100 in engagement with the outer race 32.

In FIG. 8, the resilient member is constructed as a bellows-like member 102; the terminal end 104 may be in the form of a conical lip. The member 102 can be constructed of an elastomeric material or a thermoplastic of low modulus of elasticity.

As will readily be understood, the embodiments illustrated in FIGS. 5, 6, 7 and 8 perform substantially the same functions as the preferred embodiment illustrated in FIGS. 1 through 4. Other modifications and equivalents will be apparent to one of ordinary skill in the art.

In addition, while the description is directed to one type of bearing assembly, it is equally applicable to other types and to bearings using other types of housings, as known in the art. However, applicants have described and illustrated the best mode of their invention as of the date of this application in compliance with the Patent Statures.

We claim:

1. In a bearing assembly of a housing having a central opening and a bearing cartridge in said opening, said cartridge including inner and outer races and antifriction rolling elements in rolling engagement with said races, said housing having a lubricant fitting and passageway therethrough to said cartridge and said cartridge having an opening substantially opposite to said passageway for the passage of lubricant from said fitting into said cartridge, the improvement which comprises:

resilient means having an opening therethrough for the passage of lubricant located in said passageway adjacent to said cartridge, said resilient means being in rubbing contact with said cartridge, said resilient means defining the path of lubricant introduced at said fitting substantially to said cartridge opening and, restricting the flow of lubricant along the interface between the cartridge and the central opening of housing.

2. The invention of claim 1 in which said resilient means comprises an elastomeric member.

3. The invention of claim 2 in which said resilient means member is an O-ring.

4. The invention of claim 1 in which said resilient means comprises a thermoplastic material of low modulus of elasticity.

5. The invention of claim 1 in which said resilient means member is cylindrical and has a conical lip at its terminus in engagement with said cartridge.

6. The invention of claim 1 in which said resilient means comprises a resilient member in engagement with said cartridge and a spring urging said resilient member toward said cartridge.

7. The invention of claim 1 in which said resilient means comprises a bellows-like member.

8. In a roller bearing assembly of a housing adapted to be fixed to a support, said housing having a central opening defined by an arcuate surface, and a bearing cartridge in said opening, said bearing cartridge having inner and outer races and rows of rollers each having spaced truncated conical raceways with the rollers of a row in rolling contact with opposed inner and outer raceways, the inner race having a central bore to receive a shaft, the outer race being formed of two substantially like members welded together, each said members having one of said outer raceways, the outer race having an arcuate outer surface in contact with the arcuate surface of the housing opening and being movable with respect thereto about the geometric center of the cartridge to accommodate shaft misalignment relative to the support, said outer race also having means cooperating with said housing to limit said movement with respect to the housing, said housing being provided with a lubrication passageway therethrough for the passage of lubricant to the cartridge, said cartridge having an opening through the outer race substantially aligned with the housing passageway to provide a path for lubricant to be introduced into the cartridge and to the rollers, the improvement which comprises:

resilient means having an opening therethrough for the passage of lubricant located in said passageway in wiping engagement with said outer race arcuate surface and adjacent to the lubricant opening therein to provide a defined path for the lubricant and to restrict the flow of lubricant along the interface of the housing opening surface and the outer race surface.

9. The invention of claim 8 wherein said resilient means comprises a member having a conical lip at its terminus which engages the surface of the outer race.

10. The invention of claim 8 wherein said resilient means comprises an O-ring.

* * * * *